United States Patent
Kumar et al.

(10) Patent No.: US 11,676,168 B2
(45) Date of Patent: Jun. 13, 2023

(54) IDENTIFYING VALUE CONSCIOUS USERS

(71) Applicant: Walmart Apollo, LLC, Bentonville, AR (US)

(72) Inventors: Sushant Kumar, Sunnyvale, CA (US); Hyun Duk Cho, San Francisco, CA (US); Kannan Achan, Saratoga, CA (US); Venkata Syam Prakash Rapaka, Cupertino, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 152 days.

(21) Appl. No.: 16/260,472

(22) Filed: Jan. 29, 2019

(65) Prior Publication Data

US 2019/0236637 A1 Aug. 1, 2019

Related U.S. Application Data

(60) Provisional application No. 62/623,454, filed on Jan. 29, 2018.

(51) Int. Cl.
*G06Q 30/02* (2023.01)
*G06Q 30/0207* (2023.01)
(Continued)

(52) U.S. Cl.
CPC ..... *G06Q 30/0224* (2013.01); *G06Q 30/0204* (2013.01); *G06Q 30/0631* (2013.01)

(58) Field of Classification Search
None
See application file for complete search history.

(56) References Cited

U.S. PATENT DOCUMENTS 8,407,226 B1* 3/2013 Das ............... G06F 16/9535
707/739
2001/0014868 A1* 8/2001 Herz ............... G06Q 30/02
705/14.38

(Continued)

OTHER PUBLICATIONS

Wikipedia entries for "Bayes' theorem" dated Dec. 17, 2016, "Conditional probability" dated Nov. 25, 2016, " Independence (probability theory)" dated Dec. 19, 2016, and "Law of total probability" dated Dec. 3, 2016. Retrieved using Internet Archive (archive.org). (Year: 2016).*

*Primary Examiner* — Christopher B Tokarczyk
(74) *Attorney, Agent, or Firm* — Bryan Cave Leighton Paisner LLP

(57) ABSTRACT

A method can include retrieving product information from a website database to identify a first product as a value-sensitive product identified with at least a value price tag. The method can include determining second users who are not value conscious about the first product. The method can also include preparing first and second recommendations and promotions for the first product, wherein the first recommendation comprises one or more value-sensitive products. The method additionally can include transmitting machine readable instructions to display the first recommendations and promotions for the first product for viewing by the first user. The method also can include transmitting machine readable instructions to display the second recommendations and promotions for the first product for viewing by the second user. Other embodiments are disclosed herein.

20 Claims, 6 Drawing Sheets

(51) Int. Cl.
  *G06Q 30/0204* (2023.01)
  *G06Q 30/0601* (2023.01)
  *G06Q 30/06* (2023.01)

(56) References Cited

U.S. PATENT DOCUMENTS

| | | | |
|---|---|---|---|
| 2007/0073593 A1* | 3/2007 | Perry | G06Q 30/0629 |
| | | | 705/26.64 |
| 2008/0243631 A1* | 10/2008 | Kane | G06Q 30/0631 |
| | | | 705/14.5 |
| 2011/0282749 A1* | 11/2011 | Pradeep | G06Q 30/02 |
| | | | 705/14.66 |
| 2014/0019210 A1* | 1/2014 | Beltran Guerrero | G06Q 30/02 |
| | | | 705/7.35 |
| 2014/0172621 A1 | 6/2014 | Vittolia | |
| 2016/0179966 A1* | 6/2016 | Park | G06F 16/9535 |
| | | | 707/728 |

\* cited by examiner

400

405 – Determining first users who are value conscious about a first product.

410 – Determining second users who are not value conscious about the first product.

415 – Analyzing online shopping histories of the first users and the second users.

420 – Analyzing online shopping patterns of the first users and the second users.

425 – Retrieving product information from a website database to identify the first product with a value price tag.

430 – Determining whether to display first recommendations and promotions for the first product to the first user.

440 – Determining whether to display second recommendations and promotions for the first product based on the user profile of the second user.

445 – Preparing the first recommendations and promotions for first user.

450 – Transmitting machine readable instructions to display the first recommendations and promotions for the first product for the first user.

455 – Transmitting machine readable instructions to display the second recommendations and promotions for the first product for the second user.

FIG. 4

IDENTIFYING VALUE CONSCIOUS USERS

CROSS-REFERENCE TO RELATED APPLICATIONS

This application claims the benefit of U.S. Provisional Application No. 62/623,454, filed on Jan. 29, 2018. U.S. Provisional Application No. 62/623,454 is incorporated herein by reference in its entirety.

TECHNICAL FIELD

This disclosure relates generally to human preferences for value when purchasing a value-sensitive product through on-line websites.

BACKGROUND

Websites display content for users that is regularly changing. Many value conscious users select content on websites based on pricing and value.

BRIEF DESCRIPTION OF THE DRAWINGS

To facilitate further description of the embodiments, the following drawings are provided in which:

FIG. 4 illustrates a flow chart for a method, according to another embodiment;

Figure 1:
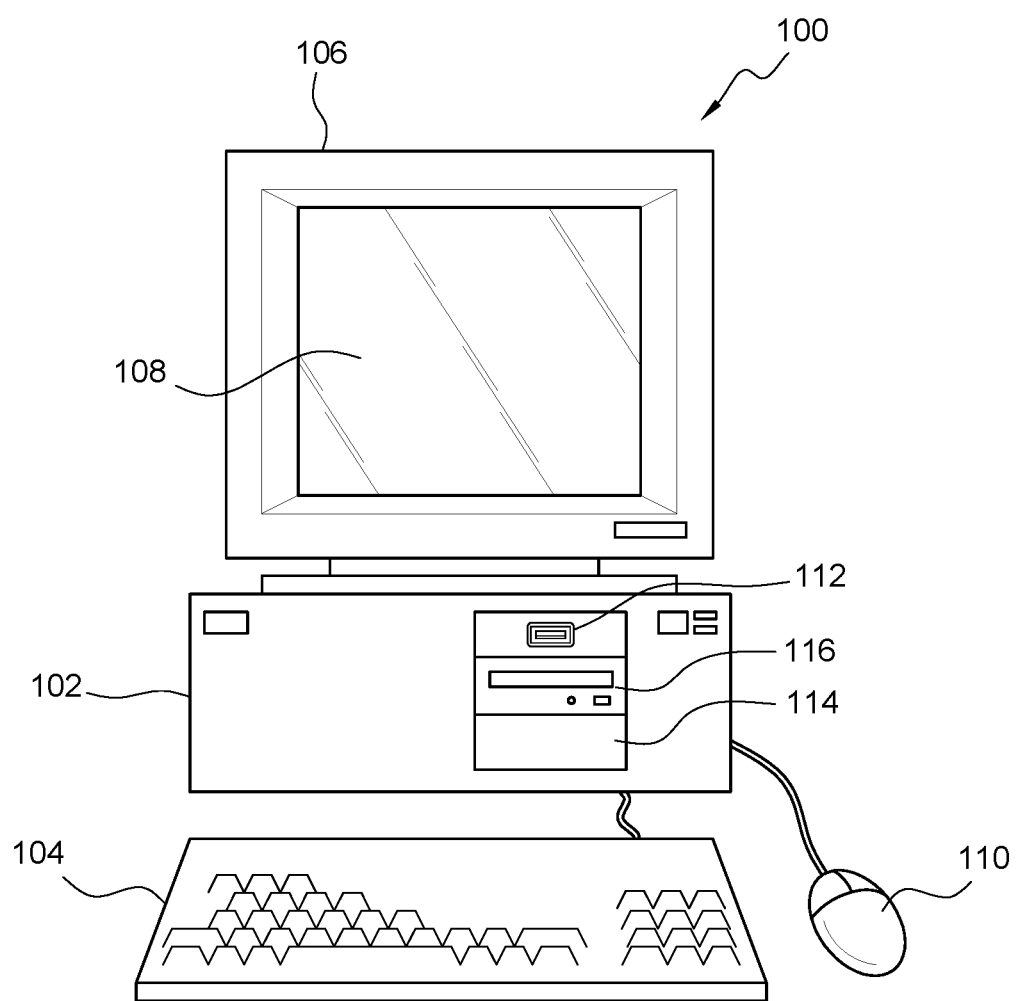
FIG. 1 illustrates a front elevational view of a computer system that is suitable for implementing an embodiment of the system disclosed in FIG. 3-6.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

Identifying Value Conscious Users

Description of Examples of Embodiments

Figure 2:
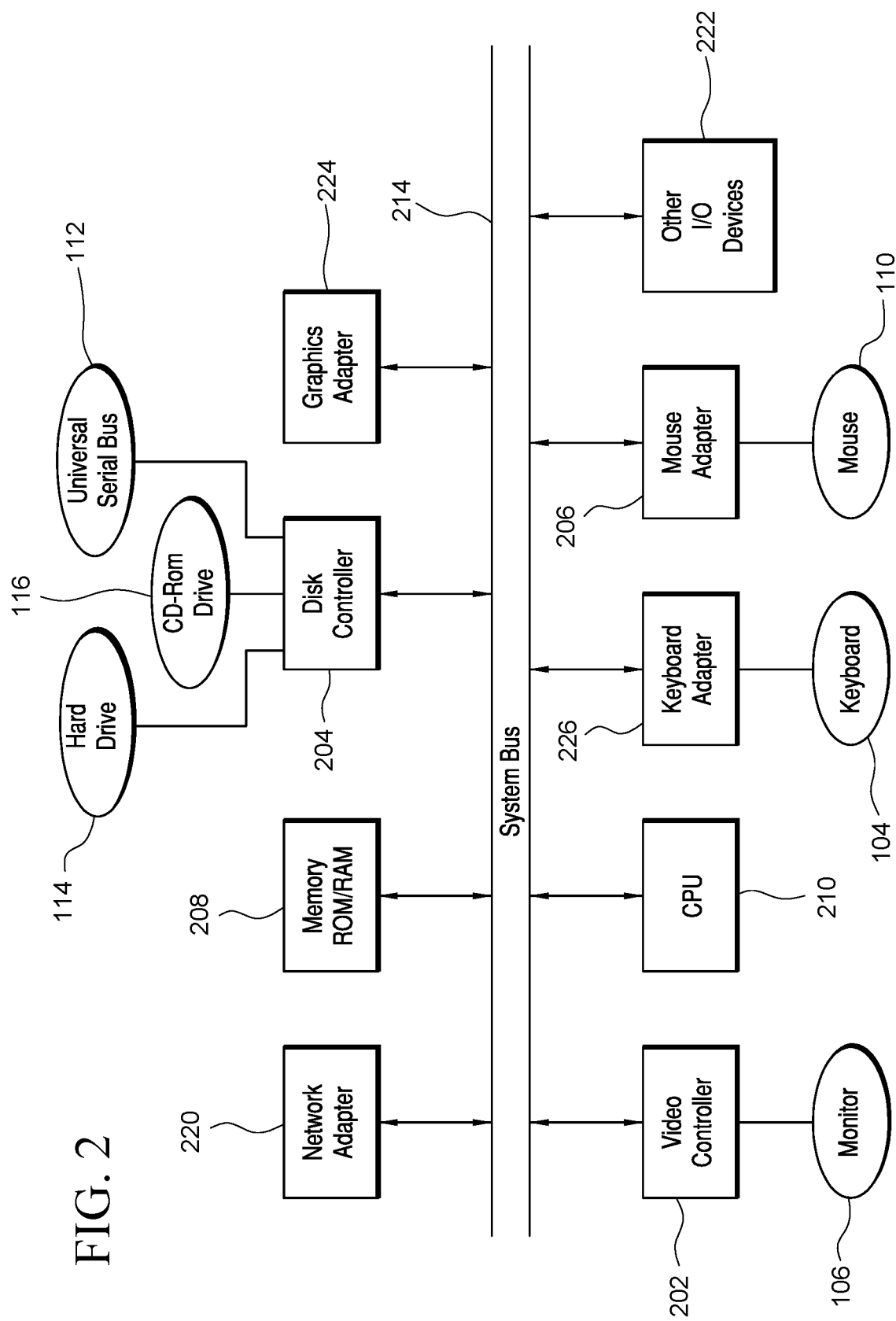
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein and/or operating part or all of one more embodiments of the memory storage modules described herein. As an example, a different or separate one of a computer system 100, all of which or a portion of which can be suitable for (i) implementing part or all of one or more embodiments of the techniques, methods, and systems and/or (ii) implementing and/or operating part or all of one or more embodiments non-transitory computer readable media described herein. As an example, a different or separate one of computer system 100 (and its internal components, or one or more elements of computer system 100) can be suitable for implementing part or all of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

In some embodiments, network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

When computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
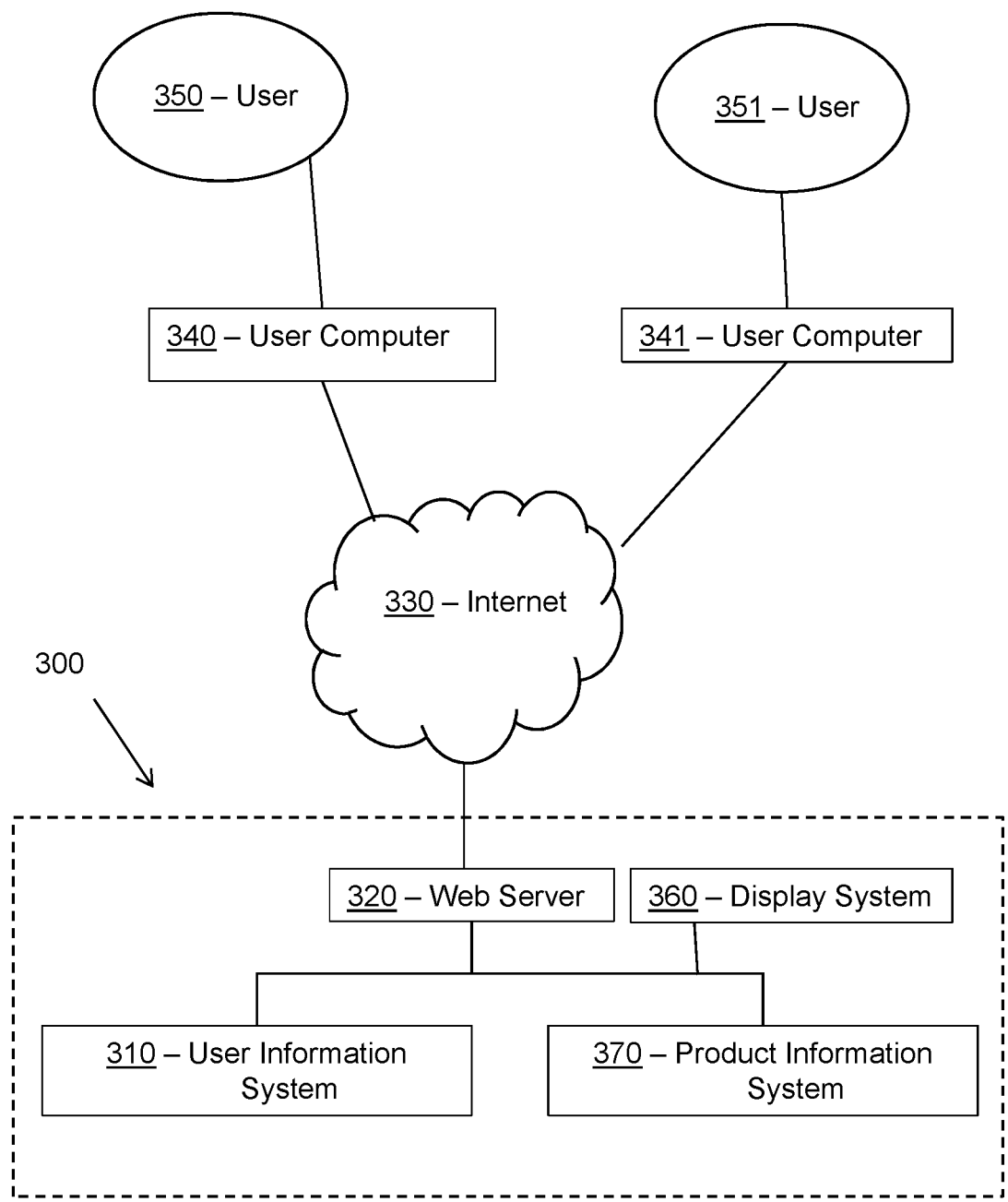
FIG. 3 illustrates a block diagram of a system that can be employed for determining users that are value conscious when purchasing a product.

Turning ahead in the drawings, FIG. 3 illustrates a block diagram of a system 300 that can be employed for determining whether some users are value conscious users (e.g., shoppers) for a given value-sensitive product or value-sensitive product category as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, retailers can desire to use efficient and accurate methods and systems in which to provide relevant products for users that purchase products on-line (e.g., browsing the webpages of the website of a retailer) or at a physical store (e.g., brick and mortar store) location of a retailer. In many embodiments, retailers can be interested in determining a segment and/or population of users that frequently purchase certain products minus a price discount, such as value-sensitive products, and still purchase other products independent of a price discount, and can provide at least relevant promotions, notifications, discounts, and/or other recommendations. In some embodiments, products having a price discount can be determined to be value-sensitive products. In many embodiments, non-brand products, that can include generic brand products and/or store brand products, can be sold at prices below a related or a similar brand of products also can be determined to be value-sensitive products. In several embodiments, identifying such segments of users (e.g., shoppers, buyers) can provide challenges in the identification of the segment of users as users (e.g., shoppers, buyers) often can purchase both value-sensitive products and products without a price discount. Additionally, users (e.g., shoppers, buyers) often browse webpages for both value-sensitive products and products without a price discount during a single session during a single session, therefore identification of such a segment of users can be far from a straightforward approach to accumulate and/or analyze data.

In many embodiments, a method or system can be presented based on tracking certain user features or activities associated with shopping for value-sensitive products that can efficiently and accurately determine and/or predict probabilities that can define such a segment and/or population of users that can be determined to be value conscious users (e.g., shoppers) for certain value-sensitive products. In another embodiment, the features and/or activities of users in the aggregate can be tracked regularly and evaluated using at least methods of conditional probabilities and specific algorithms corresponding to value-sensitive products.

In many embodiments, identifying a segment or population of users that can be determined to be value conscious for certain products also can be determined to be value-sensitive products. The terms product and item are exemplary and used interchangeably to refer to any product or any item for sale. The terms product or item, in the singular or plural tense, are merely exemplary and embodiments for determining a product or item can be employed in many different embodiments or by many different examples.

In several embodiments, by tracking user activities in the aggregate, retailers can determine a group of users that have affinities for purchasing certain products or product categories. In various embodiments, based on tracking user activities in the aggregate, retailers can determine a group of users that can have affinities for purchasing certain products or product categories, such as value-sensitive products.

In many embodiments, various methods and systems can be used by a retailer that can determine whether a user frequently purchases, browses a webpage, and/or prefers to purchase certain products, such as value-sensitive products, by tracking at least one or more user activities, user behavior, user preferences, and user purchases associated with a product, an item, a product category, an item category, and/or other consumer purchases.

In a number of embodiments, users (e.g., shoppers, buyers) that frequently purchase a value-sensitive product (including a service) on-line (e.g., while browsing a webpage or website) and/or in a physical store (e.g., brick and mortar store) can be determined to be value conscious for the value-sensitive product, and more specifically, users that frequently purchase a value-sensitive product on-line and/or in a physical store (e.g., brick and mortar store) exceeding a pre-determined number of times within a pre-determined period of time can be determined to be value conscious for certain value-sensitive products and/or for the product purchased. In some embodiments, users that frequently purchase a value-sensitive product in a value-sensitive product category on-line or in a physical store (e.g., brick and mortar store) exceeding a pre-determined number of times within a pre-determined period of time can be determined to be value conscious for the value-sensitive product category.

In various embodiments, users that do not frequently purchase a value-sensitive product (including a service) on-line (e.g., while browsing a webpage or website) and/or in a physical store (e.g., brick and mortar store) can be determined not to be value conscious for a value-sensitive product, and more specifically, users that purchase a value-sensitive product on-line or in a physical store (e.g., brick and mortar store) below a pre-determined number of times within a pre-determined period of time can be determined not to be value conscious for the product purchased. In some embodiments, users that purchase a value-sensitive product in a value-sensitive product category on-line or in a physical store (e.g., brick and mortar store) below a pre-determined number of times within a pre-determined period of time can be determined to not be value conscious for the value-sensitive product category.

In some embodiments, retailers can determine when a user is value conscious for a value-sensitive product by using conditional probabilities to calculate the interest a user has for a certain product. In several embodiments, the conditional probability equations can be based on at least one feature, or user activity, among many features and activities comprising items purchased, items searched for, items clicked, items co-bought, webpages visited, geographic location, income level, category information, product descriptions, product reviews, user profiles, and/or external websites, as discussed in greater detail below.

In many embodiments, a value-sensitive product can be a product wherein the price of the product can be discounted for sale. In some embodiments, a value-sensitive product can be a non-brand product, including a generic brand product and/or a store brand product, when the price of the non-brand product can be below the price of a name brand product with similar product descriptions and product attributes. In several embodiments, a value-sensitive non-brand product can be a generic version of a brand product independent of any price difference between the generic version of the brand product and the corresponding brand product.

In some embodiments, system 300 can include a user information system 310, a web server 320, a display system 360, and/or a product information system 370. In several embodiments, user information system 310, web server 320, display system 360, and/or product information system 370 can each be a computer system, such as computer system 100 (FIG. 1), as described above, and can each be a single computer, a single server, or a cluster or collection of computers or servers, or a cloud of computers or servers. In a number of embodiments, a single computer system can host each of two or more of user information system 310, web server 320, display system 360, and/or product information system 370. Additional details regarding user information system 310, web server 320, display system 360, and/or product information system 370 are described herein.

In many embodiments, system 300 also can comprise user computers 340, 341. In certain embodiments, user computers 340-341 can be desktop computers, laptop computers, a mobile device, and/or other endpoint devices used by one or more users 350 and 351, respectively. A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, N.Y., United States of America. In other specific examples, a head mountable wearable user computer device can comprise the Virtual Retinal Display™ product, or similar product by the University of Washington of Seattle, Wash., United States of America. Meanwhile, in further specific examples, a limb mountable wearable user computer device can comprise the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In some embodiments, web server 320 can be in data communication through Internet 330 with user computers (e.g., 340, 341). In certain embodiments, user computers 340-341 can be desktop computers, laptop computers, smart phones, tablet devices, and/or other endpoint devices. Web server 320 can host one or more websites. For example, web server 320 can host a website that allows users to browse and/or search for products, to add products to an electronic shopping cart, and/or to purchase products, in addition to other suitable activities.

In many embodiments, user information system 310, web server 320, display system 360, and/or product information system 370 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) of user information system 310, web server 320, display system 360, and/or product information system 370 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of user information system 310, web server 320, display system 360, and/or product information system 370. In a similar manner, the processing module(s) and the memory storage module(s) can be local and/or remote to each other.

In many embodiments, user information system 310, web server 320, display system 360, and/or product information system 370 can be configured to communicate with one or more user computers 340 and 341. In some embodiments, user computers 340 and 341 also can be referred to as user computers. In some embodiments, user information system 310, web server 320, display system 360, and/or product information system 370 can communicate or interface (e.g., interact) with one or more user computers (such as user computers 340 and 341) through a network or internet 330. Internet 330 can be an intranet that is not open to the public. Accordingly, in many embodiments, user information system 310, web server 320, display system 360, and/or product information system 370 (and/or the software used by such systems) can refer to a back end of system 300 operated by an operator and/or administrator of system 300, and user computers 340 and 341 (and/or the software used by such systems) can refer to a front end of system 300 used by one or more users 350 and 351, respectively. In some embodiments, users 350 and 351 also can be referred to as users, in which case, user computers 340 and 341 can be referred to as user computers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, user information system 310, web server 320, display system 360, and/or product information system 370 also can be configured to communicate with one or more databases. The one or more databases can comprise a product database that contains information about products, items, or SKUs (stock keeping units) sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between user information system 310, web server 320, display system 360, product information system 370 and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

In many embodiments, an internal network that is not open to the public can be used for communications between user information system 310, web server 320, display system 360, product information system 370. In some embodiments, the same or another internal network can be used for communications between user information system 310, web server 320, display system 360, product information system 370. Accordingly, in some embodiments, user information system 310, web server 320, display system 360, product information system 370 (and/or the software used by such systems) can refer to a back end of system 300 operated by an operator and/or administrator of system 300, and web server 320 (and/or the software used by such systems) can refer to a front end of system 300, as is can be accessed and/or used by one or more users, such as users 350-351, using user computers 340-341, respectively. In these or other embodiments, the operator and/or administrator of system 300 can manage system 300, the processor(s) of system 300, and/or the memory storage unit(s) of system 300 using the input device(s) and/or display device(s) of system 300.

Figure 5:
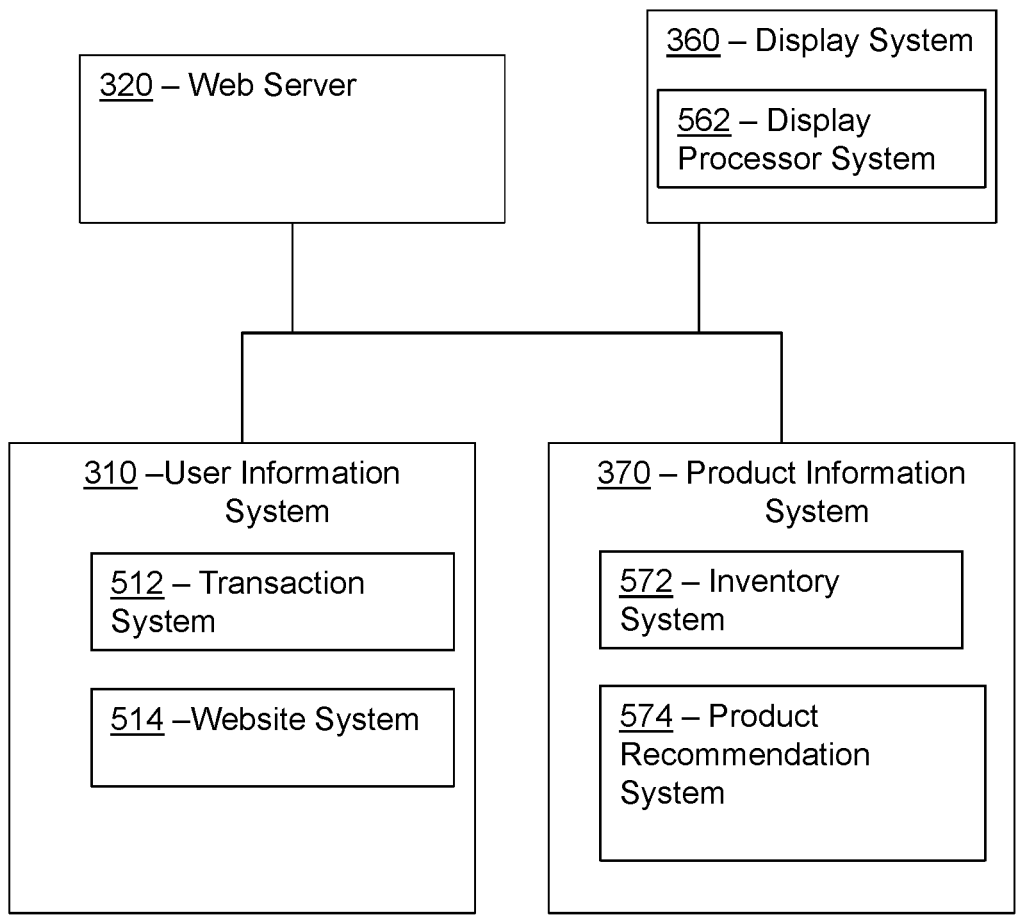
FIG. 5 illustrates a representative block diagram for determining user brand affinities for a product or product brand, according to the embodiment of FIG. 4.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules 506 (FIG. 5). Such non-transitory memory storage modules can be part of a computer system such as user information system 310 (FIGS. 3 & 5) and/or display system 360 (FIGS. 3 & 5). The processing module(s) can be similar or identical to the processing module(s) described above with respect to computer system 100 (FIG. 1) and computer system 200 (FIG. 2).

In some embodiments, method 400 and other blocks in method 400 can include using a distributed network including distributed memory architecture to perform the associated activity. This distributed architecture can reduce the impact on the network and system resources to reduce congestion in bottlenecks while still allowing data to be accessible from a central location.

Referring to FIG. 4, in many embodiments, method 400 can include block 405 for determining first users who can be determined to be value conscious about a first value-sensitive product. In a number of embodiments, websites and retailers can attract different types of users. In several embodiments, some of the users can be those who can be interested in paying a lower price for a particular product minus a price discount (i.e., value conscious). In some embodiments, websites can be able to tailor marketing and/or recommendations that can help some of these users save money and can lead to a better quality of life. In a number of embodiments, identifying some of these segments of users can be less than straightforward. In some embodiments, an algorithm that can utilize personal information can help identify these users. In many embodiments, some users who tend to purchase frequently value-sensitive products can be value conscious users. Examples of value-sensitive products are provided below. In several embodiments, users can be value conscious on some value-sensitive products at certain times, while at other times, they are not price sensitive to the same and/or different prices or costs for the same and/or different products independent of a price discount.

In some embodiments, block 405 can include a user (e.g., shopper, buyer) who can be interested in purchasing a certain computer with certain product attributes, brands, and/or product descriptions. In various embodiments, a user can spend money on high-end hardware, and at the same time, the same user is not interested in purchasing high-end cookware, but can be interested in purchasing cookware from inexpensive brands. In several embodiments, various methods and systems can incorporate value consciousness for some users for a given and/or a particular item using a conditional probability that a user can be a value conscious user. In many embodiments, some methods and systems can determine that a user can be a value conscious user by using a conditional probability equation that can be formally calculated expressed as p(vc|c, i) where p is probability, vc is value consciousness, c is a particular user of interest and i is an item of interest. Some embodiments use this information to aggregate this information and can derive value consciousness of a given user. In several embodiments, a sequence of equations can be expressed below, wherein each sequential equation builds from the previous equation culminating to the end equation (1) expressed as:

$$p(vc|c) \approx \Sigma_{i \in Items}\, p(vc|c,\, i) \cdot p(i|c) \qquad (1)$$

where each sequential equation listed below is not based on the activities and/or behavior of c, a particular user of interest. Additionally, Items refers to a set or sets of items that can be sold at a retail store, or a set or sets of items that the retailer can be interested in promoting, wherein a variable on the upper limit is implied. The sequential expanding equations for p(vc|c) as expressed:

$$p(vc\,|\,c) = \frac{\sum_{i \in Items} p(vc\,|\,c,\,i) \cdot p(c,\,i)}{p(c)}$$

$$= \frac{\sum_{i \in Items} p(vc\,|\,c,\,i) \cdot p(c\,|\,i) \cdot p(i)}{p(c)}$$

$$= \frac{\sum_{i \in Items} p(vc\,|\,c,\,i) \cdot p(c\,|\,i) \cdot \frac{p(c)}{p(i)}}{p(c)}$$

In this expanding equation sequence, p(i) and p(c) are constant, where p(i) is probability of the item of interest and p(c) is the probability of the particular user of interest.

In some embodiments, block 405 can be based on some of these intuitions where the conditional probability that a particular user c will likely show interest in the item i based on particular feature from a combination of features wherein the resulting derivation of p(vc|c, i) can be calculated. Some embodiments can be defined as p(vc|c, i) using a feature from a list of features f in particular, wherein a feature or activity of a particular user of interest refers to the intention, interest, or preference of the particular user for an item of interest, as can be expressed in the equation below:

$$p(vc|c, i) = \sum_{f} w_f \cdot p(vc|c, f), \quad (2)$$

$$\sum_{f} w_f = 1,$$

where $w_f$ denotes a weight for a feature f, and p (vc|c, f) denotes the value consciousness of the particular user for an item derived in the equation using a single feature f of a list of features listed below wherein the list of features are exemplary features.

In many embodiments using the above conditional probability equation, where $w_f$ denotes a weight for a feature f, the equation can set $w_f$ based on a hill climbing algorithm by optimizing towards revenue. In several embodiments, the hill climbing algorithm can be adjusted using data gathered from a click through rate, and/or an engagement rate, depending on requirements of the retailer. In some embodiments, for some features f that can be less than dependent on users can be expressed as a conditional probability in this equation: p(vc|c, f)=p(vc|f). Some features that are utilized in this conditional probability are based on some of the following activities of the user expressing intention, interest, or preference for an item, wherein this list of features is merely exemplary in nature and can include: items bought, items searched for, items clicked, items co-bought, pages visited, geographical location, income level, category information, product descriptions, product reviews, user profiles, and referred external web sites.

In a number of embodiments, method 400 can include a block 410 for determining second users who can be determined not to be value conscious about the first product. In some embodiments, users who do not tend to frequently purchase value-sensitive products can be users who can be determined not to be value conscious. In many embodiments, some users can be value conscious on some products, while at other times they can be sensitive not to the difference in price or costs between some products.

In some embodiments, method 400 can include a block 415 analyzing on-line shopping histories of the first users and the second users. In some embodiments, the shopping histories can include on-line shopping histories and/or physical store (e.g., brick and mortar store) shopping histories. In many embodiments, websites and retailers can register and/or store various user or user profiles based on the purchasing behaviors and/or purchasing histories of users or users associated with one or more retailers. In some embodiments, user profiles can include additional user information, such as, whether the user has children, the gender or age of the children, the age and/or gender of the user, hobbies, pets, and/or many other ways that can describe users. In several embodiments, user profiles can have different measures of value consciousness. In a number of embodiments, users can act differently depending on a persona a user can take on. As an example, some users can purchase expensive products when buying pet related products, but purchase cheaper products when they take on a different home persona.

In some embodiments, method 400 can include block 415 for a given search query, q, the user can have ultimately clicked on an item i. This can be given as p(i|q). In some embodiments using the results from the previous features section, p(vc|q) can be derived as:

$$p(vc|q) = \Sigma_{i \in Items} p(vc|i) \cdot p(i|q) \quad (3)$$

wherein, p is for probability and vc is for value consciousness.

In some embodiments, block 415, can be associated with queries q' ∈ Q for search query q. The method can be generic enough that such approaches can be used for these purposes.

In a number of embodiments, method 400 can include a block 420 of analyzing on-line shopping patterns of the first users and the second users. In some embodiments, the shopping patterns can include on-line shopping patterns, on-line browsing activity, and/or physical store (e.g., brick and mortar store) shopping patterns. In some embodiments, some webpages of websites of one or more retailers can be more indicative of value consciousness than other webpages where a webpage comprising value-sensitive items can be a webpage browsed by users determined to be value conscious. In several embodiments, when a webpage leads to a value-sensitive product, this webpage can be considered as a value conscious webpage. In some embodiments, differences with product purchases can be on one webpage that can lead into another webpage resulting in webpage trails, so these webpage trails and/or modeling trails comprising user activity can be taken into account to determine whether a user can be value conscious for a value-sensitive product.

Modeling trails ultimately can be defined as the following:

$$P(e|g_1) = \pi_i p(g_i|g_{i-1}) \cdot p(e|g_n) \quad (4)$$

where e can be the end state and/or a final page visited in a given web browsing session, $g_i$ can be the ith page the user can be visiting in a given web browsing session, $g_n$ is the nth page in a session, $g_1$ is the first page visited in a given web browsing session, and p is for probability. In some cases e can be whether a user has ended the session in a value-sensitive product or not. In some embodiments, ultimately, we can have $p(vc|g_1) = p(i|g_1) \cdot p(vc|i)$. In some embodiments, a given page can take a features page type (item page, category page, search page, homepage), and can include latent and/or hidden labels of the page (e.g., webpage).

Some embodiments, block 420 can utilize sequential labeling techniques, wherein a label can comprise a page (e.g., webpage) a user is visiting, to derive $P(e|g_1)$. There are various methods to learn sequential labels, for instance, Hidden Markov Models (HMM), Conditional Random Fields (CRF), or Long Short Term Memory (LSTM) are some examples of these.

In some embodiments, method 400 can include a block 425 of retrieving product information from a website database to identify the first product with a value price tag. In several embodiments, some websites and retailers can have various tags assigned to products. In various embodiments, some value price tags can include rollback tags, clearance tags, special buy tags, and/or other such value price tags. In a number of embodiments, value price tags can be indicative of lower prices. In many embodiments, some websites and retailers can indicate products with these types of price tags to be value-sensitive products. In some embodiments, as noted above, some users who tend to purchase frequently from value-sensitive products can be value conscious users, and some users can be value conscious on some products, while at other times they can be less than sensitive to different costs or differences in prices for a product.

In some embodiments where method 400 includes blocks 415 and 420, items co-bought and/or co-clicked can be further expanded by the term p(vc|i, c) by the products that can be co-bought and/or co-clicked, wherein p is for probability, i is for item, and c is a particular user. In several embodiments, a commonly used method can be used that can capture co-bought and/or co-clicked item that can be a matrix factorization. In many embodiments, an algorithm can leverage low-rank matrices that can infer latent features for some given users and items. In various embodiments, some latent features can be used to calculate the behavior of some users. In many embodiments, some behaviors can be a rating of some products from the perspective of some users, and/or it can be an interaction between some products and some users. Some embodiments can extend this framework, and can instead infer the value-product-ness and/or value-sensitivity of some given item. Some embodiments can recall that $p(vc|i)=\Sigma_t\, p(vc|t) \cdot p(t|i)$, wherein, p is for probability, vc is for value consciousness, i is for item, and t is for tag. If some embodiments can infer the latent p(t|i) then some embodiments can calculate its value-product-ness of some given item. Some embodiments can formulate the following equation, as expressed:

$$\min_{U,I,T} \|V-U \cdot I\| + \|W-I \cdot T\| + \|U\| + \|I\| + \|T\| \tag{5}$$

where U, I, and T can be U for a user, I for an item, and T for a tag matrices, respectively. V is for product purchases and/or clicks while browsing a website and/or webpages and W is for the probability of p(t|i) where V and W can be pre-populated with a purchase history of a user and tags for an item. After the computation, some embodiments can be find tag probability W.

In several embodiments, method 400 can include blocks 415 and 420 of analyzing shopping histories and shopping patterns of a user based on a feature f, wherein p(vc|c, f), refers to value-sensitive items purchased and/or clicked on when browsing a website or webpage of a retailer, wherein p is for probability, vc is for value consciousness, c is a particular user, and t is for tag. In many embodiments, an item can have value-sensitive tags wherein the determination of when an item can be a value-sensitive item comprises the addition of one or more tags associated with the item. In some embodiments, the tags can comprise clearances, special buys, rollbacks, and other price discount tags. The tags can be assigned the probability p(vc|t) where t is the tag of interest, p is for probability, and vc is for value consciousness. In several embodiments, using the probability p(vc|t), a probability equation can be generated to determine whether this product is value-sensitive or not. In many embodiments, a product that is value-sensitive can be flagged as value-sensitive where the conditional probability can be derived as p(vc|i) as further discussed below, wherein p is for probability, vc is for value consciousness, and i is for item.

In some embodiments, method 400 also can include a block 425 of retrieving product information from a website database to identify the product with a value price tag. In several embodiments, a value-sensitive item can have value conscious tags (clearance, special buy, rollback) associated with it. In some embodiments, some tags can be assigned p(vc|t) where t can be the tag of interest, p is for probability, and vc is for value consciousness. In several embodiments, using tags can be used to generate a flag regarding whether this product can be value-sensitive or not. Ultimately some embodiments can derive p(vc|i), wherein p is for probability, vc is for value consciousness, and i is for item. Some embodiments can already have p(t|i) and in using it can have:

$$p(vc|i)=\Sigma_t p(vc|t) \cdot p(t|i) \tag{6}$$

wherein, p is for probability, vc is for value consciousness, i is for item, and t is for tag.

In some embodiments, block 425 can be associated with some product descriptions and attributes that also can be used to detect value consciousness. In many embodiments, product descriptions and attributes that also can be used to detect value consciousness can be particularly useful for products that can be infrequently purchased and/or when a website and/or retailer can expand to a wider array of products. In a number of embodiments that already have p(vc|i), product descriptions and attributes that also can be used to detect value consciousness can be valid for items that have high purchase counts. In many embodiments, on the other hand, product descriptions, attributes and reviews can tend to talk about similar attribute-value pairs. For example, in some embodiments a user can say a product is "good for the price," but this particular comment can be used on products across many different categories. Similarly, some attributes can be more effective for some given demographics over the others. In some embodiments, by learning common descriptions and attributes for value conscious users websites and retailers can be able to leverage these features instead when not enough users had purchased the product. In various embodiments, websites and retailers can extend the feature set from tag-specific to non-tag-specific products.

For some products that sold at least a minimum number exceeding a pre-determined threshold with a pre-determined period of time, websites and retailers get p(vc|i), expressed as:

$$p(vc|a)=\Sigma_{i \in Items}\, p(vc|i) \cdot p(i|a) \tag{7}$$

where a can be the attribute, p is for probability, vc is for value consciousness, and i is for item.

In some embodiments, using this framework, websites and retailers can derive attributes corresponding to some product descriptions and some product reviews. In several embodiments, word embedding can allow one to find latent features for a given word. In some embodiments, some examples of these include Word2Vec, PCA, and LDA, to name a few. In several embodiments, the word embedding can output distribution of probabilities over latent features. In many embodiments, the latent or hidden features for a product can be denoted as p(a|i), which can be then derived p(i|a) using Bayesian probabilities wherein p is probability, a is for an attribute of interest, and i is for an item of interest.

In a number of embodiments, method 400 can include a block 430 of determining whether to display one or more first recommendations and promotions for the first product to the first user. In several embodiments, a determining can be based on the user profile of the first user. In some embodiments, block 430 can include determining whether to not display the one or more first recommendations and promotions for the first product to the second user. As an example, the first recommendations and promotions can include a list of value-sensitive products, additional price discounts for the value-sensitive products, early notifications of sales, early notifications when a value tag is added to an item, reminders, coupon codes, and/or other price discounts.

In some embodiments, method 400 can include a block 440 of determining whether to display one or more second recommendations and promotions for the first product to the second user. In many embodiments, a determining can be based on the user profile of the second user. In some embodiments, block 440 can include determining whether to not display one or more second recommendations and promotions for the first product to the first user. As examples, the second recommendations and promotions can be similar to the first recommendations and promotions and the first recommendations and promotions can be for larger discounts and savings than for the second recommendations and promotions.

In many embodiments, some websites and retailers can provide various user profiles based on purchasing behavior of users. In a number of embodiments, user profiles can cover (e.g., include) whether the user has children, the gender or age of the children, the age or gender of users, hobbies, pets, and/or the many other ways to describe users. In some embodiments, user profiles have different measures of value consciousness. In several embodiments, users (e.g., shoppers, buyers) can act differently depending on the persona that they can take. As an example, some users can purchase expensive products when buying pet related products, but purchase cheaper products when they take a new home persona. The terms user and user are exemplary and used interchangeably to refer to any user or user of the system that conducts activities such as purchasing items, browsing for items, searching for items, requesting queries for items and/or other engagement activity related to shopping in general. The terms user or user item, in the singular or plural, are merely exemplary and can include products and/or services.

In some embodiments, to realize this goal, some websites and retailers can calculate value consciousness for a given profile and users. In particular, as expressed:

$$p(vc \mid c, r) = \frac{(p(c) \cdot p(vc \mid c)) \cdot (p(r) \cdot p(vc \mid r))}{p(r \mid c) \cdot p(c)} \quad (8)$$

where r can be a given user profile or user profile, p is for probability, vc is for value consciousness and c is a particular user. In some embodiments, user profiles can have assigned scores which can be represented in p(r|c). We can infer p(vc|r) by aggregating profiles of users who can belong in this category. In particular, as expressed:

$$p(vc \mid r) = \frac{\sum_{c \in R} p(vc \mid c) \cdot p(c)}{p(r)} \quad (9)$$

where p is for probability, vc is for value consciousness, c is for a particular user, and R is for the set of users at the websites and retailers.

In some embodiments, an equation can give (e.g., express) the likelihood that a particular user profile can belong to a value conscious category. In some embodiments, user profile features also can be expanded to category affinities that can show how likely a user can be to view, click or purchase from a given category. In some embodiments, similar processes can be run as can be given in user profile features to derive category features.

In a number of embodiments, method 400 can include a block 445 of preparing the first recommendations and/or promotions for a first user. In some embodiments, block 445 can occur before blocks 430 and/or 440. In the same or different embodiments, block 445 and/or a different block (not shown) in method 400 can include preparing the second recommendations and/or promotions for the second user.

In some embodiments, method 400 can include a block 450 of transmitting machine readable instructions to display the one or more first recommendations and/or promotions for the first product for the first user. In some embodiments, block 450 can include not transmitting machine readable instructions to display the one or more first recommendations and promotions for the first product for the second user.

In a number of embodiments, method 400 can include a block 455 of transmitting machine readable instructions to display the one or more second recommendations and promotions for the first product for the second user. In some embodiments, block 455 can include not transmitting machine readable instructions to display the one or more second recommendations and promotions for the first product for the first user.

Turning to the drawings, FIG. 5 illustrates a block diagram of a portion of system 300 comprising user information system 310, web server 320, display system 360, and product information system 370, according to the embodiment shown in FIG. 3. Each of user information system 310, web server 320, display system 360, and/or product information system 370 is merely exemplary and not limited to the embodiments presented herein. Each of user information system 310, web server 320, display system 360, and/or product information system 370 can be employed in many different embodiments or examples not specifically depicted or described herein. In some embodiments, certain elements or modules of user information system 310, web server 320, display system 360, and/or product information system 370 can perform various procedures, processes, and/or acts. In other embodiments, the procedures, processes, and/or acts can be performed by other suitable elements or modules. In many embodiments, the systems of user information system 310, web server 320, display system 360, and/or product information system 370 can be modules of computing instructions (e.g., software modules) stored at non-transitory computer readable media. In other embodiments, the systems of user information system 310, web server 320, display system 360, and/or product information system 370 can be implemented in hardware.

In many embodiments, modules within user information system 310, web server 320, display system 360, and/or product information system 370 can store computing instructions configured to run on one or more processing modules and perform one or more acts of methods 400 (FIG. 4) (e.g., transaction system 512 for analyzing physical store (e.g., brick and mortar store) shopping histories of first users and second users in block 415 (FIG. 4); website system 514 for analyzing website shopping histories of the first users and the second users in block 415 (FIG. 4); display processor system 562 for transmitting machine readable instructions to display the first recommendations and promotions for the first product for viewing by the first user in block 450 (FIG. 4), and for transmitting readable instructions to display the second recommendations and promotions for the first product for viewing by the second user in block 455 (FIG. 4); inventory system 572 for retrieving product information from a website database to identify the first product with a value tag in block 425 (FIG. 4); and product recommendation system 574 for determining whether to display first recommendations to the first user in block 430 (FIG. 4) and whether to display second recommendations to the second user in block 440 (FIG. 4), and for preparing the first and second recommendations and promotions to the first user and the second user in block 445 (FIG. 4).)

In a number of embodiments, user information system 310 can include a transaction system 512 and a website system 514. In certain embodiments, transaction system 512 and website system 514 can perform block 405 (FIG. 4) of determining first users who are value conscious about a first product. In certain embodiments, transaction system 512 and website system 514 also can perform block 410 (FIG. 4) of determining second users who are not value conscious about the first product. In certain embodiments, transaction system 512 and website system 514 can perform block 415 (FIG. 4) of analyzing shopping histories of the first users and the second users. In certain embodiments, transaction system 512 and website system 514 can perform block 420 (FIG. 4) of analyzing shopping patterns of the first users and the second users.

In some embodiments, product information system 370 can include inventory system 572. In certain embodiments, inventory system 572 can perform block 425 (FIG. 4) of retrieving product information from a website database to identify the first product with a value price tag.

In a number of embodiments, product information system 370 also can include product recommendation system 574. In certain embodiments, product recommendation system 574 can perform block 430 (FIG. 4) of determining whether to display first recommendations and promotions for the first product to the first user. In some embodiments, product recommendation system 574 also can perform block 440 (FIG. 4) determining whether to display second recommendations and promotions for the first product based on the user profile of the second user. In some embodiments, product recommendation system 574 can also perform block 445 (FIG. 4) preparing the first and second recommendations and promotions for the first user and the second user, respectively.

In a number of embodiments, display system 360 can include display processor system 562. In some embodiments, display processor system 562 can perform block 430 (FIG. 4) of determining whether to display first recommendations and promotions for the first product to the first user. In some embodiments, display processor system 562 also can perform block 440 (FIG. 4) determining whether to display second recommendations and promotions for the first product based on the user profile of the second user. In some embodiments, display processor system 562 can perform block 450 (FIG. 4) transmitting machine readable instructions to display the first recommendations and promotions for the first product for viewing by the first user. In some embodiments, display processor system 562 also can perform block 455 (FIG. 4) transmitting machine readable instructions to display the second recommendations and promotions for the first product for viewing by the second user.

Figure 6:
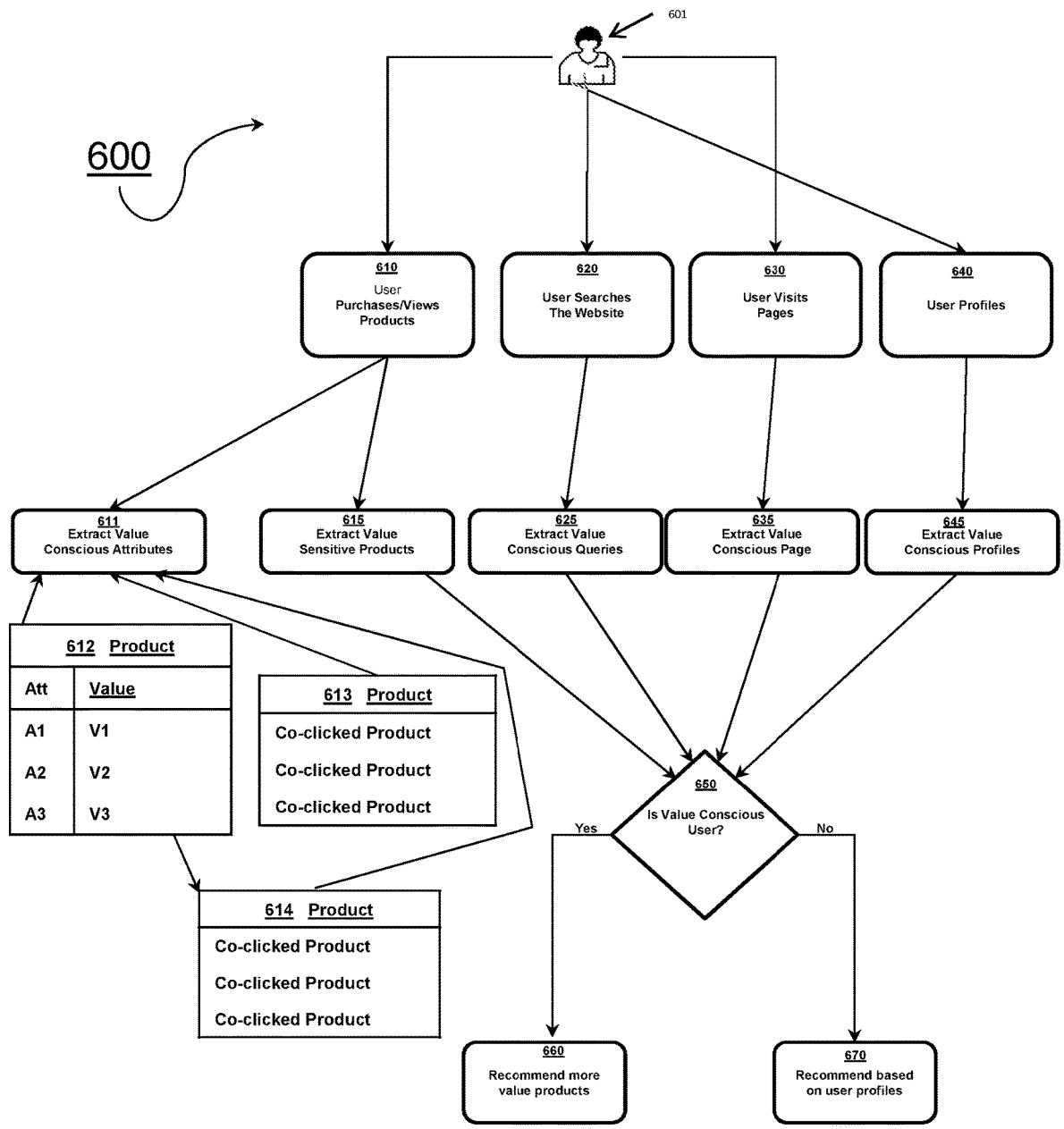
FIG. 6 illustrates a flow chart for a method, according to another embodiment.

Turning ahead to the drawing, FIG. 6, illustrates a flowchart for one or more conditional probabilities using various features and combinations of features in the equations set forth above where it can be determined based on one or more features or activities of a user 601 and whether a user 601 can be value conscious 650 for a value-sensitive item. (See at least equation (1)). In some embodiments, block 600 can be a non-limiting and non-exhaustive embodiment depicting the method and/or system whereupon any one or more activities can be tracked and analyzed to determine whether or not some users 601 can be categorized as value conscious users (e.g., shoppers) 650, 660, corresponding to certain value-sensitive products based on the above one or more conditional probability equations.

For example, the block 600 depicts a user 601 engaging in various features or activities for a given value-sensitive product. Block 600 is merely exemplary and is not limited to the embodiments presented herein. Block 600 can be employed in many different embodiments or examples not specifically depicted or described herein. In some embodiments the procedures, the processes, and/or the activities of block 600 can be performed in any suitable order. In still other embodiments, one or more of the procedures, the processes, and/or the activities of block 600 can be combined or skipped.

In many embodiments, when a user 601 engages in features or activities a number of times exceeding a pre-determined threshold during a pre-determined period of time, it can be determined that the user can be value conscious 650 for a given value-sensitive product wherein a retailer can recommend more value and/or value-sensitive products 660 to the user 601. In several embodiments, when a user 601 engages in features or activities a number of times below a pre-determined threshold during a pre-determined period of time, it can be determined that the user can be not value conscious 650, 670, for a given value and/or value-sensitive product wherein a retailer can recommend products based on the user or user profile stored with the retailer for the user 601.

In another embodiment of FIG. 6, user 601 purchases value and/or value-sensitive products 610. (See at least equations (1), (3), (4), (5), and (6).) Block 600 can extract data comprising value-sensitive attributes 611 and value-sensitive products 615 from purchases and/or the purchase history of the user (e.g., shopper, buyer). Further block 611, can compare the extracted value-sensitive product attributes associated with the value-sensitive item purchased by the user or user 601 with a database of the retailer that stores aggregated data of other users that previously purchased the value-sensitive item with the attribute 612, the value-sensitive item co-purchased with another related item in the on-line session represented by block 613, and the value-sensitive item co-clicked on a website or webpage with other items during an on-line session represented by block 614.

Block 612 can synchronize value-sensitive products with block 613 regarding one or more co-purchased products and block 614 regarding co-clicked products when the value-sensitive items with certain attributes shown in block 612 was co-purchased with other items in a session represented by block 613 and/or co-clicked with other items in a session represented by block 614. Blocks 610, 611, 615 can utilize at least equation (1) to perform a conditional probability calculation to determine whether the user can be value conscious for a value-sensitive product or value-sensitive products 650. When the level of probability exceeds a pre-determined threshold for a pre-determined period of time, it can be determined that the user can be likely value conscious for certain value-sensitive products analyzed using the blocks of 611, 612, 613, 614, 615, wherein block 660 can recommend at least additional value-sensitive products, other related value-sensitive products, early notifications of price discounts, reminders, and/or additional discounts for the value-sensitive product. In many embodiments, when the level of probability is below a pre-determined threshold for a pre-determined period of time, it can be determined that the user is likely not value conscious for certain value-sensitive products analyzed using the blocks 611, 612, 613, 614, 615, wherein block 670 can recommend other items and/or price discounts for the other items that correspond to the profile data in the user profile stored in a user database of the retailer.

In another embodiment of FIG. 6, user 601 views a website or webpage for value-sensitive products 630, 635 during an on-line session. (See at least equations (1) (3), (4), (5), (6), and (7)). Block 600 can extract data comprising value-sensitive attributes 611 and value-sensitive products 615 from purchases and/or the purchase history of the user or user. Further block 611, can compare the extracted value-sensitive product attributes associated with the value-sensitive item purchased by the user or user 601 with a database of the retailer that stores aggregated data of other users or users that previously purchased the value-sensitive item with the attribute(s), as shown in block 612, the value-sensitive item co-purchased with another related item in the on-line session represented by block 613, and the value-sensitive item co-clicked on a website or webpage with other items during an on-line session represented by block 614.

Block 612 can synchronize value-sensitive products with block 613 regarding one or more co-purchased products and block 614 regarding one or more co-clicked products when the value-sensitive items with certain attributes, as shown in block 612, was co-purchased with other items during a session represented by block 613 and/or co-clicked with other items in a session represented by block 614. In several embodiments, blocks of 610, 611, 615, 635 utilize at least equations (1), (5), and (7) to perform a conditional probability calculation to determine whether the user can be value conscious for a value-sensitive product or value-sensitive products 650. In some embodiments, when the level of probability exceeds a pre-determined threshold for a pre-determined period of time, it can be determined that the user can likely be value conscious for certain value-sensitive products analyzed using the blocks of 611, 612, 613, 614, 615, wherein block 660 can recommend at least additional value-sensitive products, other related value-sensitive products, early notifications of price discounts, reminders, and/or additional discounts for the value-sensitive product. In many embodiments, when the level of probability is below a pre-determined threshold for a pre-determined period of time, it can be determined that the user is likely not value conscious for certain value-sensitive products analyzed using the blocks of 611, 612, 613, 614, 615, wherein block 670 can recommend other items or price discounts for the other items that correspond to the profile data in the user profile stored in a user database of the retailer.

Turning to another embodiment of FIG. 6, user 601 performs one or more searches using queries searching or requesting various products on a website and webpages of a retailer of block 620 during an on-line session. (See at least equations (1) and (3).) In some embodiments, a website can have a value conscious webpage when it either leads to value-sensitive products and/or comprises value-sensitive products, as shown in blocks 620, 625. (See at least equations (1) and (4).) In many embodiments, block 625 can extract and analyze search queries searching and/or requesting product information for value-sensitive products during a session. In various embodiments, when the level of probability exceeds a pre-determined threshold for a pre-determined period of time, it can be determined that the user can likely be value conscious for certain value-sensitive products analyzed using blocks 620, 625, wherein block 660 can recommend at least additional value-sensitive products, other related value-sensitive products, early notifications of price discounts, reminders, and/or additional discounts for the value-sensitive product. In a number of embodiments, when the level of probability is below a pre-determined threshold for a pre-determined period of time, it can be determined that the user can be not likely to be value conscious for certain value-sensitive products analyzed using blocks 620, 625, wherein block 670 can recommend other items and/or price discounts for the other items that can correspond to the profile data in the user profile stored in a user database of the retailer.

Referring to an embodiment of FIG. 6, user 601 can engage in browsing a website and clicking on various webpages of a retailer of blocks 630, 635. (See at least equations (1), (4), and (5).) In many embodiments, block 635 can extract and/or analyze the value conscious webpages for value-sensitive products. In several embodiments, when the level of probability exceeds a pre-determined threshold for a pre-determined period of time, it can be determined that the user is likely value conscious for certain value-sensitive products analyzed using blocks 630 and/or 635, wherein block 660 recommends at least additional value-sensitive products, other related value-sensitive products, early notifications of price discounts, reminders, and/or additional discounts for the value-sensitive product. In a number of embodiments, when the level of probability is below a pre-determined threshold for a pre-determined period of time, it can be determined that the user is likely not value conscious for certain value-sensitive products analyzed using the blocks of 630 and/or 635, wherein block 670 can recommend other items or price discounts for the other items that correspond to the profile data in the user profile stored in a user database of the retailer.

Referring to an embodiment of FIG. 6, user 601 provides the retailer with a user profile based on either registering with a retailer, purchasing items on the website of the retailer and/or a physical store (e.g., brick and mortar store) location of the retailer or through browsing, clicking, and searching the website and/or webpages of the retailer 640, 645. (See at least equations (1), (8), and (9).) In several embodiments, a user profile comprises user information regarding marital status, children, gender, age, hobbies, pets, geographic locations, income levels, purchase history, browsing, clicking, and searching history, and other descriptions of a user stored in a database of the retailer. In many embodiments, when a user does not possess information or enough information in for blocks 610, 620, and/or 630, to warrant relevant information to be added to the variables in at least equation (1), the method or system defaults to the information stored in a user profile to determine whether a user or user is value conscious for a value-sensitive product. In some embodiments, when the level of probability exceeds a pre-determined threshold for a pre-determined period of time, it can be determined that the user can likely be value conscious for certain value-sensitive products analyzed using block 645, wherein block 660 can recommend at least additional value-sensitive products, other related value-sensitive products, early notifications of price discounts, reminders, and/or additional discounts for the value-sensitive product. In several embodiments, when the level of probability is below a pre-determined threshold for a pre-determined period of time, it can be determined that the user can not likely be value conscious for certain value-sensitive products analyzed using block 645, wherein block 670 can recommend other items or price discounts for the other items that correspond to the profile data in the user profile stored in a user database of the retailer.

In several embodiments, the principles described herein can be rooted in computer technologies that can overcome existing problems in known database systems, specifically problems dealing with increasing available bandwidth, reducing network traffic and efficiently managing databases. In many embodiments, some known database systems cannot handle massive amounts of network traffic or database requests, while keeping latency to an acceptable level and/or avoiding server crashes. In some embodiments, the principles described in this disclosure can provide a technical solution (e.g., one that utilizes databases in novel ways) for overcoming such problems. In a number of embodiments, this technology-based solution can mark an improvement over existing computing capabilities and functionalities related to database systems by improving bandwidth, reducing network traffic and permitting greater database efficiency (e.g., by processing combined read/delete requests). In several embodiments, some novel systems can be designed to improve the way databases store, retrieve, delete and transmit data.

In many embodiments, the techniques described herein can provide several technological improvements. Specifically, the techniques described herein can provide for reducing network load by enabling users to find relevant information faster. In some embodiments, by reducing the network load, the system and method described herein can help to improve CPU, memory and cache performance for underlying recommendation systems. In several embodiments, this improvement can directly reduce the number of service calls per second and can translate into better usage of various system components like CPU, memory, hard disk, etc. In many embodiments, as noted above, some methods and systems can be capable of processing huge store purchase data efficiently and can allow recommendation systems to isolate or filter users (e.g., shopper, buyer) by determining which users can be value conscious for specific value-sensitive products based on these models using smaller memory footprint.

One advantage of the techniques and/or approaches described above is that once value conscious users can be identified, users can be presented primarily with relevant products that can have great value-sensitivity as opposed to a general pool of items, hence reducing the number of pages (e.g., webpages) users would need to browse in order to reach the items of specific interest (e.g., purchasing) to those specific users. In many embodiments, this approach can be different from previous approaches, which applied subjective human manual determinations, and/or did not involve manually annotating users who can be value-sensitive. In several embodiments, identifying value conscious users does not exist in other conventional approaches. In some embodiments, because this method covers the identification of users itself, any approach of identifying item recommendations can be used. This level of personalization for transmitting recommendations and promotions does not exist in conventional approaches to targeted e-mails to particular groups. Moreover, because this method covers the identification of users itself, any approach of identifying item recommendations can be used. Moreover, this level of personalization in the timing of when the user can be sent the e-mail does not exist in conventional approaches, which typically transmit recommendations and promotions to each user at a present time after a certain action, or to all of a group of users at the same time after a certain event (e.g., after a price discount).

Additionally, the techniques described herein can run continuously based on new information and data continually being received from actions of users (e.g., 350-351 (FIG. 3)) on the website hosted by web server 320 (FIG. 3) and the responses to the users (e.g., 350-351 (FIG. 3)) to the e-mails that continue to get sent out. In many embodiments, running these techniques continually (e.g., hourly, daily, etc.) can provide real-time determinations of which e-mail and at what time to send the e-mail to a particular user, based on the current activity (e.g., within the last hour, day, etc.) of the user on the website and based on the activity of other users on the website and responses of other users to the e-mails within the last hour, day, etc.

In many embodiments, the techniques described herein can be used regularly (e.g., hourly, daily, etc.) at a scale that cannot be handled using manual techniques. For example, the number of monthly visits to the website can exceed approximately one hundred million, and the number of registered users to the website can exceed approximately ten million.

The techniques described herein solve a technical problem that cannot be solved using more traditional forms of advertising such as direct mail via the United States Postal Service. In fact, the techniques described herein cannot be applied to such traditional forms of advertising because any of the learning models, including logistic regression, cannot be trained in view of a lack of data, as described in greater detail above. For example, it would not be possible to know whether a recipient of the direct mail reviewed the direct mail and, in response to the reviewing the direct mail, typed the web address on the direct mail into the recipient's web browser to view a web page, or whether the recipient happened to view that web page due to another referral source.

In many embodiments, the techniques described herein can provide several technological improvements. Specifically, the techniques described herein can provide for improved techniques that can better provide products that can be of interest to users (e.g., shoppers, buyers). In some embodiments, typical users can be interested in different value-sensitive products with varying intensity. In several embodiments, users can be interested in value-sensitive products that can be sold by, or manufactured by, any given brand. This technique can improve upon conventional (e.g., existing techniques) product recommender systems. In some embodiments, by identifying value-sensitive products of interest for users, these systems can provide recommendations using heavier weights on certain value-sensitive products of interest of the user thereby, improving certain marketing automation techniques. In a number of embodiments, by identifying value-sensitive products of interest to these users, some marketers can send product advertisements and/or messages that can best capture the varying (e.g., evolving) interests of users to enhance the quality of recommendation content to the specific user. In some embodiments, by maintaining a distribution pertaining to a high confidence of accuracy using the scores obtained for users with an affinity for value-sensitive products, the method and/or systems can leverage the information to transmit communications for value-sensitive products using maximal precision that can reduce wasting computer resources.

In many embodiments, some conventional approaches that can be used by other recommender systems and/or other networks do not take into account users who can be value conscious with affinities for value-sensitive products which can lead to additional inefficiencies in using computer resources when deriving relevant product recommendations displayed and/or transmitted to users, as described in greater detail above. In several embodiments, given a pool of products that can be of interest to value conscious users, by sending the recommendations to the subset of customers who can be interested in the set of particular value-sensitive products can reduce the amount of computer resources often used to calculate the same calculation for those users who are not interested in the recommendations. In some embodiments, by reducing the computer resources used for calculations based on all categories (e.g., classes) of users regardless of an affinity value-sensitive products, the methods and/or systems can improve upon conventional approaches by reducing overall network usage. As an example, suppose 10% of the users can be identified as value conscious users, wherein computing resources to run recommendation calculations for the remaining 90% of users would no longer be necessary for those value-sensitive products in which the 90% of users have shown no affinity towards those value-sensitive products, thereby reducing the computing requirements significantly.

In various embodiments, as previously described above, conventional approaches used by web server systems and/or networks do not take into account value conscious users that can lead to the inefficient use of computer resources for storing relevant raw data. In some embodiments, specifically using a conventional recommender system, huge amounts of raw data can be used to predict products that can be of interest to users without identifying certain value-sensitive products in the data. In several embodiments, by identifying value conscious users, the huge amount of raw data can be consolidated when used in any of the learning models and also can lead to using less hard disk space to store the smaller (e.g., lesser) amounts of user data, as discussed in greater detail above.

A number of embodiments can include a system for identifying value conscious users including one or more processors and one or more non-transitory computer-readable media storing computing instructions configured to run on the one or more processors and perform certain acts. The acts can include retrieving product information from a website database to identify a first product as a value-sensitive product identified with at least a value price tag. The acts also can include determining first users who are value conscious about the first product. The acts can include determining second users who are not value conscious about the first product. The acts additionally can include analyzing shopping histories of the first users and the second users. The acts can include analyzing shopping patterns of the first users and the second users. The acts can also include preparing first and second recommendations and promotions for the first product, wherein the first recommendation comprises one or more value-sensitive products. The acts can include determining whether to display the first recommendations and promotions for the first product to the first users. The acts can also include determining whether to display the second recommendations and promotions for the first product to the second users based on user profiles of the second users. The acts additionally can include transmitting machine readable instructions to display the first recommendations and promotions for the first product for viewing by the first user. The acts also can include transmitting machine readable instructions to display the second recommendations and promotions for the first product for viewing by the second user.

Various embodiments can include a method being implemented via execution of computing instructions configured to run at one or more processors and stored at one or more non-transitory computer-readable media. The method can include retrieving product information from a website database to identify a first product as a value-sensitive product identified with at least a value price tag. The method also can include determining first users who are value conscious about the first product. The method can include determining second users who are not value conscious about the first product. The method additionally can include analyzing shopping histories of the first users and the second users. The method can include analyzing shopping patterns of the first users and the second users. The method can also include preparing first and second recommendations and promotions for the first product, wherein the first recommendation comprises one or more value-sensitive products. The method can include determining whether to display the first recommendations and promotions for the first product to the first users. The method can also include determining whether to display the second recommendations and promotions for the first product to the second users based on user profiles of the second users. The method additionally can include transmitting machine readable instructions to display the first recommendations and promotions for the first product for viewing by the first user. The method also can include transmitting machine readable instructions to display the second recommendations and promotions for the first product for viewing by the second user.

Although systems and methods for identifying value conscious users have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-6 may be modified, and that the foregoing discussion of certain of these embodiments does not necessarily represent a complete description of all possible embodiments. For example, one or more of the procedures, processes, or activities of FIGS. 3, 4, and 5 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:
1. A system comprising:
one or more processors; and
one or more non-transitory computer-readable media storing computing instructions, that when executed on the one or more processors, cause the one or more processors to perform:
retrieving product information from a website database;
identifying a first product as a value-sensitive product by at least a value price tag, wherein the product information comprises one or more value-sensitive product attributes derived from product reviews;
detecting, using the product reviews, value consciousness for products that are infrequently purchased by:

deriving, using word embedding, (1) latent features of each respective word of one or more of the product reviews associated with the first product, and (2) a distribution of probabilities over the latent features;

determining, using historical value-sensitive descriptions, whether each respective word of the one or more of the product reviews associated with the first product is associated with a value-sensitive description;

identifying a segment of first users who are value conscious about the first product by:
 tracking features of the first users based on a number of historical purchases of value-sensitive products over a period of time;
 evaluating a number of activities of the first users that exceed a predetermined threshold during a predetermined time period for the first product, indicating the first users are value conscious; and
 generating, using a conditional probability equation, a probability that a first user of the first users will show interest in an item based on a feature from a combination of features, wherein the conditional probability equation is based on a sequence of equations that builds using data from each previous sequential equation, wherein each sequential equation is based on a set of products sold at a respective retail store, and wherein each sequential equation is further reconfigured based on data from a previous sequential equation culminating to an output based on an end equation;

determining second users who are not value conscious about the first product;

analyzing shopping histories of the first users and the second users;

analyzing shopping patterns of the first users and the second users;

leveraging low-rank matrices to infer additional latent features for the first users, the second users, and one or more products;

calculating a behavior of the first users and the second users by capturing, using matrix factorization, products that are co-bought;

preparing a first recommendation, a first promotion, a second recommendation, and a second promotion for the first product, wherein the first recommendation comprises one or more value-sensitive products;

determining whether to display the first recommendation and the first promotion for the first product to the first users;

determining whether to display the second recommendation and the second promotion for the first product to the second users based on user profiles of the second users;

transmitting instructions to display the first recommendation and the first promotion for the first product for viewing by the first user; and transmitting instructions to display the second recommendation and the second promotion for the first product for viewing by the second user.

2. The system of claim 1, wherein:
the value price tag comprises at least one of a rollback price tag, a clearance price tag, or a special buy price tag;

analyzing the shopping histories of the first users and the second users further comprises analyzing website activities, including browsing, search queries, or reading product reviews; and analyzing the shopping patterns of the first users and the second users further comprises analyzing at least one of website search queries for value-sensitive products and webpage visits extracted from specifically-designed value conscious webpages or transactions.

3. The system of claim 1, wherein:
identifying the first product as the value-sensitive product by at least the value price tag comprises identifying the first product as the value-sensitive product by a term p(vc|t) where t is a value tag to determine whether a product from a group of products is assigned the value price tag by using an algorithm expressed as p(vc|i)=$\Sigma_t$p(vc|t)·p(t|i), wherein vc is value consciousness, c is a particular user, and i is a product of interest.

4. The system of claim 1, wherein:
analyzing the shopping patterns for the first users and the second users comprises analyzing on-line shopping patterns for the first users and the second users; and
the on-line shopping patterns further comprise:
 a user purchase history;
 a user browser activity;
 a user value conscious webpage visit; and
 a user profile.

5. The system of claim 1, wherein:
identifying the first product as the value-sensitive product by at least the value price tag further comprises identifying the first product as the value-sensitive product by deriving the one or more value-sensitive product attributes corresponding to a product review of the product reviews of a product of interest by using an algorithm expressed as:

(vc|a)=sum$_i$p(vc|i)·p(i|a), wherein a is one of the one or more value-sensitive product attributes, vc is value consciousness, c is a particular user of the first users, and i is the product of interest.

6. The system of claim 1, wherein:
identifying the segment of the first users who are value conscious about the first product comprises calculating whether a user profile of a particular user is a value conscious user, as expressed by an algorithm:

$$p(vc\,|\,c, r) = \frac{(p(c) \cdot p(vc\,|\,c)) \cdot (p(r) \cdot p(vc\,|\,r))}{p(r\,|\,c) \cdot p(c)}$$

wherein r is the user profile, p is for probability, vc is for value consciousness, c is the particular user of the first users, and each user profile is assigned a respective score which is represented in p(r|c).

7. The system of claim 1, wherein:
identifying the segment of the first users who are value conscious about the first product comprises running the sequence of equations by analyzing user features utilized in the determining of the first users by using a term p(vc|c,i), defined as a combination of features, as expressed in an algorithm:

p(vc|c)≈$\Sigma_{i \in Items}$ p(vc|c, i)·p(i|c), wherein p is a probability function, vc is a value consciousness, c is a particular user of interest, i is a product of interest, Items are a set of items sold or promoted, $w_f$ denotes a weight for a feature f, wherein f represents features that are independent of behaviors of the particular user of interest, and wherein the algorithm comprises the end equation.

8. The system of claim 1, wherein:
transmitting the instructions to display the first recommendation and the first promotion for the first product for viewing by the first user comprises updating (a) a specific webpage of a website displaying the value-sensitive product and (b) the website with the first recommendation and the first promotion.

9. The system of claim 1, wherein:
preparing the first recommendation and the first promotion for the first product comprises preparing larger discounts and savings for the first recommendation and the first promotion than for the second recommendation and the second promotion.

10. The system of claim 1, wherein:
preparing the second recommendation and the second promotion comprises preparing discounts and savings for the second recommendation and the second promotion based on descriptions in the user profiles of the second users comprising at least age, family size, pets, hobbies, geographic location, and gender.

11. A method being implemented via execution of computing instructions configured to run at one or more processors and stored at one or more non-transitory computer-readable media, the method comprising:
retrieving product information from a website database;
identifying a first product as a value-sensitive product by at least a value price tag, wherein the product information comprises one or more value-sensitive product attributes derived from product reviews;
detecting, using the product reviews, value consciousness for products that are infrequently purchased by:
deriving, using word embedding, (1) latent features of each respective word of the one or more of the product reviews associated with the first product, and (2) an output of a distribution of probabilities over the latent features;
determining, using historical value-sensitive descriptions, whether each respective word of the one or more of the product reviews associated with the first product is associated with a value-sensitive description;
identifying a segment of first users who are value conscious about the first product by:
tracking features of the first users based on a number of historical purchases of value-sensitive products over a period of time;
evaluating a number of activities of the first users that exceed a predetermined threshold during a predetermined time period for the first product, indicating the first users are value conscious; and
generating, using a conditional probability equation, a probability that a first user of the first users will show interest in an item based on a feature from a combination of features, wherein the conditional probability equation is based on a sequence of equations that builds using data from each previous sequential equation, and wherein each sequential equation is based on a set of products sold at a respective retail store, wherein each sequential equation is further reconfigured based on data from a previous sequential equation culminating to an output based on an end equation;
determining second users who are not value conscious about the first product;
analyzing shopping histories of the first users and the second users;
analyzing shopping patterns of the first users and the second users;
leveraging low-rank matrices to infer additional latent features for the first users, the second users, and one or more products;
calculating a behavior of the first users and the second users by capturing, using matrix factorization, products that are co-bought;
preparing a first recommendation, a first promotion, a second recommendation, and a second promotion for the first product, wherein the first recommendation comprises one or more value-sensitive products;
determining whether to display the first recommendation and the first promotion for the first product to the first users;
determining whether to display the second recommendation and the second promotion for the first product to the second users based on user profiles of the second users;
transmitting instructions to display the first recommendation and the first promotion for the first product for viewing by the first user; and
transmitting instructions to display the second recommendation and the second promotion for the first product for viewing by the second user.

12. The method of claim 11, wherein:
the value price tag comprises at least one of a rollback price tag, a clearance price tag, or a special buy price tag;
analyzing the shopping histories of the first users and the second users further comprises analyzing website activities, including browsing, search queries, or reading product reviews; and
analyzing the shopping patterns of the first users and the second users further comprises analyzing at least one of website search queries for value-sensitive products and webpage visits extracted from specifically-designed value conscious webpages or transactions.

13. The method of claim 11, wherein:
identifying the first product as the value-sensitive product by at least the value price tag comprises identifying the first product as the value-sensitive product by a term $p(vc|t)$ where t is a value tag to determine whether a product from a group of products is assigned the value price tag by using an algorithm expressed as $(vc|i) = \Sigma_t p(vc|t) \cdot p(t|i)$, wherein vc is value consciousness, c is a particular user, and i is a product of interest.

14. The method of claim 11, wherein:
analyzing the shopping patterns for the first users and the second users comprises analyzing on-line shopping patterns for the first users and the second users; and
the on-line shopping patterns comprise:
a user purchase history;
a user browser activity;
a user value conscious webpage visit; and
a user profile.

15. The method of claim 11, wherein:
identifying the first product as the value-sensitive product by at least the value price tag further comprises identifying the first product as the value-sensitive product by deriving the one or more value-sensitive product attributes corresponding to a product review of the product reviews of a product of interest by using an algorithm expressed as:

$$(vc|a) = \text{sum}_i p(vc|i) \cdot p(i|a),$$

wherein a is one of the one or more value-sensitive product attributes, vc is value consciousness, c is a particular user of the first users, and i is the product of interest.

16. The method of claim 11, wherein:

identifying a segment of first users who are value conscious about the first product comprises calculating whether a user profile of a particular user is a value conscious user, as expressed by an algorithm:

$$p(vc \mid c, p) = \frac{(p(c) \cdot p(vc \mid c)) \cdot (p(p) \cdot p(vc \mid p))}{p(r \mid c) \cdot p(c)}$$

where r is the user profile, p is for probability, vc is for value consciousness, c is the particular user of the first users, and each user profile is assigned a respective score which is represented in p(r|c).

17. The method of claim 11, wherein:

identifying a segment of first users who are value conscious about the first product comprises running the sequence of equations by analyzing user features utilized in the determining of the first users by using a term p(vc|c, i), defined as a combination of features, as expressed in an algorithm:

$$p(vc|c) \approx \Sigma_{i \in \text{Items}} \, p(vc|c, i) \cdot p(i|c),$$

wherein, p is a probability function, vc is a value consciousness, c is a particular user of interest, i is a product of interest, Items are a set of items sold or promoted, $w_f$ denotes a weight for a feature f, wherein the f represents features that are independent of behaviors of the user of interest, and wherein the algorithm comprises the end equation.

18. The method of claim 11, wherein:

transmitting the instructions to display the first recommendation and the first promotion for the first product for viewing by the first user comprises updating (a) a specific webpage of a website displaying the value-sensitive product and (b) the website with the first recommendation and the first promotion.

19. The method of claim 11, wherein:

preparing the first recommendation and the first promotion for the first product comprises preparing larger discounts and savings for the first recommendation and the first promotion than for the second recommendation and the second promotion.

20. The method of claim 11, wherein:

preparing the second recommendation and the second promotion comprises preparing discounts and savings for the second recommendation and the second promotion based on descriptions in the user profiles of the second users comprising at least age, family size, pets, hobbies, geographic location, and gender.

* * * * *